United States Patent
Tompkin et al.

(10) Patent No.: US 6,871,788 B2
(45) Date of Patent: Mar. 29, 2005

(54) COIN PROVIDED WITH DIFFRACTION STRUCTURES

(75) Inventors: Wayne Robert Tompkin, Baden (CH); René Staub, Cham (CH); Andreas Hasler, Chur (CH); Jakob Jütz, Grabs (CH); Martin Müller, Davos-Dorf (CH)

(73) Assignee: OVD Kinegram AG, Zug (CH)

( * ) Notice: Subject to any disclaimer, the term of this patent is extended or adjusted under 35 U.S.C. 154(b) by 277 days.

(21) Appl. No.: 09/936,935
(22) PCT Filed: Jan. 18, 2001
(86) PCT No.: PCT/EP01/00517
§ 371 (c)(1), (2), (4) Date: Jan. 31, 2002
(87) PCT Pub. No.: WO01/52685
PCT Pub. Date: Jul. 26, 2001

(65) Prior Publication Data
US 2002/0154290 A1 Oct. 24, 2002

(30) Foreign Application Priority Data
Jan. 21, 2000 (DE) .......................................... 100 02 644

(51) Int. Cl.$^7$ ............................................... G06K 19/00
(52) U.S. Cl. ........................ 235/487; 235/491; 235/454
(58) Field of Search ................................ 235/487, 457, 235/491, 454; 356/71

(56) References Cited

U.S. PATENT DOCUMENTS

| | | | |
|---|---|---|---|
| 4,108,367 A | 8/1978 | Hannan | |
| 4,250,393 A | 2/1981 | Greenaway | |
| 5,046,841 A | 9/1991 | Juds et al. | |
| 5,101,184 A | 3/1992 | Antes | |
| 5,881,196 A * | 3/1999 | Phillips | .................. 385/127 |

* cited by examiner

Primary Examiner—Karl D. Frech
(74) Attorney, Agent, or Firm—Hoffmann & Baron, LLP

(57) ABSTRACT

A coin (1) with a metal surface (2, 3) has macroscopic reliefs (5) which serve for visually specifying the value of the coin and as an authenticity feature. Microscopically fine relief structures (8) with a diffraction effect are formed directly in at least one of the surfaces (2, 3). The relief structures (8) are preferably arranged in a recessed relationship and are covered with a lacquer (9). It is also advantageous if at least a part of the relief structures (8) entails an asymmetrical profile shape and/or the grating vectors in a radial orientation. The release structures (8) may also include a machine-readable coding which is recognized by inexpensive optical reading devices for installation in coin testers.

The application of the microscopic relief structure (8) to a hard material surface (2, 3) can be effected by the removal of material by means of exposure of the material surface (2, 3) with a laser beam. In that operation the laser beam passes through a mask for determining the form of the relief structures (8) and then an optical image-forming system for reduction purposes. The exposure procedure can also be implemented in accordance with the dual beam interference method. In a further method the microscopic relief structures (8) are etched into the material surface (2, 3).

17 Claims, 5 Drawing Sheets

COIN PROVIDED WITH DIFFRACTION STRUCTURES

BACKGROUND OF THE INVENTION

The invention concerns a coin having security elements as set forth in the classifying portions of claims 1 and 2, coin testers with reading devices for testing the authenticity of such coins in accordance with the classifying portions of claims 7 and 9 and methods of manufacturing such coins as set forth in the classifying portions of claims 11 and 14.

Such coins are suitable as payment means which are particularly forgery-proof. It is known that coins with macroscopic reliefs can be easily forged and that electronic coin testers which test the geometric and metallic properties of coins can be deceived with counterfeit coins or coins from other countries.

U.S. Pat. No. 5,216,234 discloses coin-like disks or tokens. Differently inclined reflective surfaces which form a code are impressed into the surface of the disk on a circular ring around the central point of the disk. The reflective surfaces reflect incident light at different predetermined directions. The reflected light is analysed in a reading device by means of photodetectors and the genuine tokens are detected in that way.

U.S. Pat. No. 5,046,841 describes a disk which is molded from plastic material and which has circular rings arranged in point-symmetrical relationship with respect to the central point of the disk. In each circular ring, the surface has predetermined optical properties such as refracting or reflecting or diffracting light. A combination of the circular rings with different surface properties forms a code which permits optical-mechanical detection of the token. Instead of being divided into circular rings, the token can also be divided into circular ring segments involving different surface properties.

In addition utility model DE-G 92 04 029.2 describes a disk-shaped security chip of plastic material. Those disks carry on at least one disk surface a visually detectable, decorative hologram so that the chip is also suitable as an advertising carrier. The hologram is disposed on the surface of the chip.

Finally, Research Disclosure No 374 031 (1995; Kenneth Mason Publications Ltd) describes metal coins with a diffractive security element. The security element is for example a foil portion with a diffractive structure, which is fixed by adhesive in a recess in the surface. The security element can also be embossed directly into the metal surface. Such a product of fine gold can be obtained under the trade mark KINEBAR®. The diffractive structures used can be for example a hologram structure, a kinoform as described in CH-653 782, or an OVD ('optically variable device') in accordance with EP 0 105 099 B1. The diffractive security elements are a sign of the authenticity of the product and, in a configuration described in EP 0 366 858 A1, permit optical-mechanical detection of the coins.

SUMMARY OF THE INVENTION

The object of the invention is to inexpensively provide a coin with a security feature which is difficult to forge and simple to check, to provide a method of applying a corresponding, microscopically fine, diffractive relief structure in a hard material surface, and to implement compact and inexpensive apparatuses for testing the authenticity of such coins, which are suitable for subsequent fitment to existing coin testers.

In accordance with the invention the specified object is attained by the features of claims 1, 2, 7, 9, 11 and 14.

BRIEF DESCRIPTION OF THE DRAWINGS

Embodiments of the invention are described in greater detail hereinafter with reference to the drawing in which.

DESCRIPTION OF THE PREFERRED EMBODIMENTS

Figure 1:
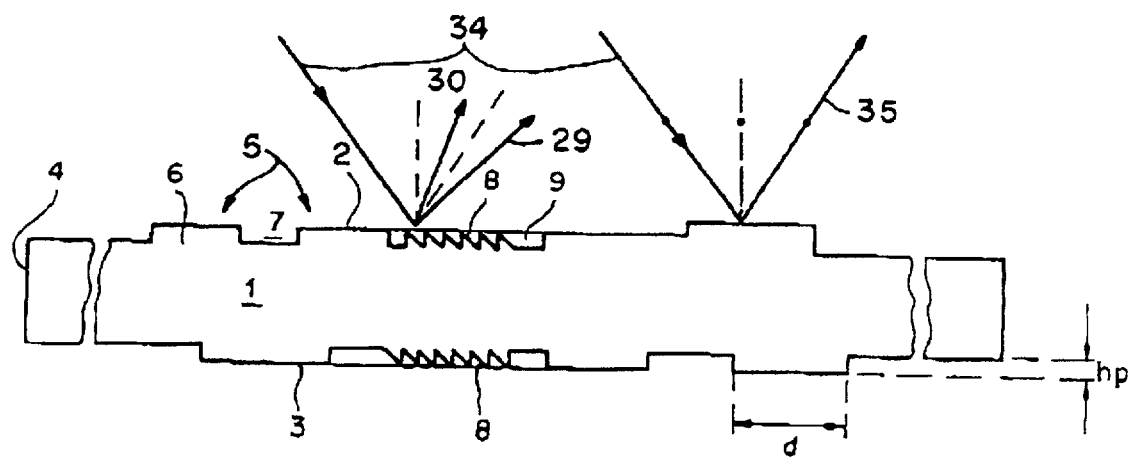
FIG. 1 shows a view in cross-section of a coin.

FIG. 1 in a view which is not to scale shows a cross-section through a coin 1. The coin 1 has two approximately parallel surfaces 2, 3 and a rim surface 4. The surfaces 2, 3 are provided with macroscopic reliefs 5 forming raised portions 6 and recesses 7. Microscopic relief structures 8 having a diffraction effect are formed in the bottom of at least one recess 7, which bottom is parallel to the surfaces 2, 3. The macroscopic reliefs 5 represents graphic patterns which firstly provide information about the origin and the value of the coin and which secondly serve as a visual authenticity feature. Their typical structural dimensions such as width d and profile height hp are in the millimeter and tenths-of-a-millimeter range. They are such that in part they reflect and/or diffusely scatter incident light beams 34 in the form of beams 35. The profile of the macroscopic relief 5 is shown as being rectangular in the view in FIG. 1, for reasons relating to representation in the drawing. In actual fact the profile of the relief 5 is determined by the graphic motif or pattern and has at least rounded edges. The drawing also does not show an upset rim ridge which is to be found on many kinds of coins, for protecting the image on the coin. In contrast the microscopic relief structures 8 are of substantially smaller structural dimensions whose parameters of line spacing and profile height are typically in the range of micrometers and tenths of a micrometer. They diffract the incident light beams 34 in the form of partial beams 29, 30, of predetermined directions. The relief structures 8 are advantageously designed for checking the authenticity of the coin 1 by machine. The recessed arrangement protects the microscopic relief structures 8 from damage and from wear phenomena. In order to ensure that, in use, the grooves or lines of the relief structure do not fill with particles of dirt which could alter the diffraction properties or cause them to disappear, the relief structure 8 is advantageously covered with a transparent, synthetic resin-based protective lacquer 9. A protective lacquer which is free from solvents and which for example can be caused to set with ultraviolet light is advantageously used.

Figure 2:
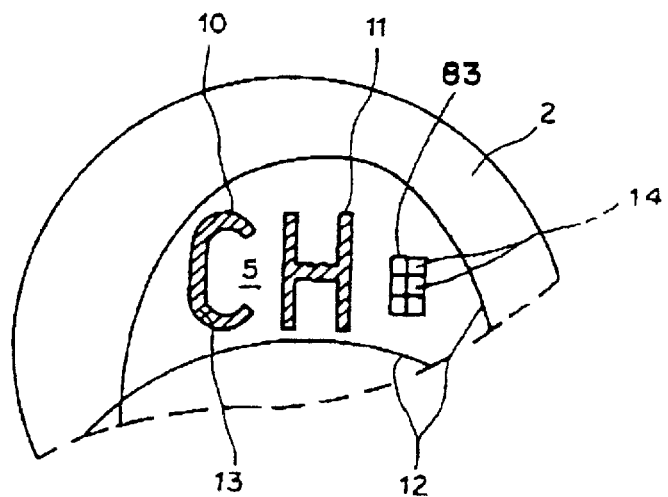
FIG. 2 shows a plan view of a portion of the coin.

FIG. 2 shows a plan view on to the surface 2 of a part of the coin 1. The surface 2 contains recessed faces 10, 11 which in the view in FIG. 2 represent the contours of the letters 'C' and 'H'. The faces 10, 11 are part of the macroscopic relief 5. The faces 10, 11 contain the microscopic relief structure 8 (FIG. 1) in the form of gratings 13. The relief 5 together with the relief structure 8 represents a preferably visually checkable security feature as the gratings 13 produce optical-diffraction effects which are visible under normal lighting conditions. In addition the relief structure 8 is also machine-readable. For machine checking using infrared radiation, in itself a number of lines of between 200 and 300 lines per millimeter is sufficient. If however the relief structure 8 is also to produce readily visible visual diffraction effects, a number of lines of typically 800 lines per millimeter is preferred. The number of lines however can be anywhere between 50 and 3,000 lines per millimeter. In one embodiment the coin 1 includes guilloche patterns 12 of less than 0.2 mm width with relief structures 8 which, upon movement of the coin 1 or upon rolling thereof on the rim surface 4, produce alternate optical effects, as are known from above-mentioned EP 105 099 B1.

Besides the sawtooth-shaped asymmetrical relief structure 8 shown by way of example in FIG. 1, it is also possible to use symmetrical or asymmetrical profile shapes of known periodic functions for the relief structure 8 of the gratings 13. The use of an asymmetrical relief structure 8 is preferred as it affords the advantage that the authenticity of the coin 1 can be judged on the basis of the different levels of intensity of the partial beams 29, 30 which are diffracted into the plus first and into the minus first diffraction order because, with the asymmetrical profile shapes, the intensity of the partial beam 29 which is diffracted into the plus first diffraction order is greater than the intensity of the partial beam 30 diffracted into the minus first diffraction order. Superimposition of a plurality of grating structures which are known for example from WO 99/38039 also produce the partial beams 29, 30 with different levels of intensity.

Preferably, the coin 1 in FIG. 2 also has a number N of mutually juxtaposed fields 14 with the further relief structures 8 which are selected from a set of M different predetermined gratings 13 so that, upon machine checking of the coin 1 with optical reading devices, as are described hereinafter, an entire multiplicity of partial beams of the first diffraction order, which are diffracted up to 2·N, is produced. Various coins 1 can thus be coded according to country and value insofar as an identification in the form of a combination of predetermined gratings 13 is associated with each country and each coin value in the fields 14. For example the number N of fields 14 is equal to twelve, of which the first eight fields 14 represent 8 bits which serve as a country code, while the last four fields 14 represent 4 bits for encoding the value involved. Thus, when the authenticity of the coin is tested by machine, it is also possible to detect the origin and value thereof.

The known coins 1, as are circulated by the national banks of many States, are round. Coin testers which are adapted for machine checking of the authenticity of coins 1 and which are used for example in telephones, automatic sales machines and so forth, generally have a coin passage in which the coin 1 to be tested rolls or slides down, in which case it passes optical reading devices and/or magnetic sensors, along an inclined path of movement. In the case of coin testers which have to check a very large quantity of coins 1 in a short time and which are used for example by banks, the coins 1 do not roll along a coin passage but are transported by a transport device (not further described hereinafter), which will also be referred to hereinafter as the coin passage.

If both surfaces 2, 3 of the coin 1 contain the same microscopic relief structure 8, it is sufficient for the coin tester to check only one of the surfaces 2, 3. If the coin 1 is provided with the microscopic relief structure 8 only on the one surface 2 or 3, manufacture of the coins 1 is simplified as a result. In that case however the coin tester must be adapted for optical checking of both surfaces 2, 3.

Examples of coins 1 and optical reading devices will now be described, in which the microscopic relief structures 8 of the coin 1 and the optical reading device are matched to each other. The relief structures 8 serve in any event at least as a machine-checkable authenticity feature which is difficult to counterfeit. In an embodiment, the relief structures 8 further include machine-readable coding with additional items of information, for example relating to the origin and the value of the coin, which are to be detected by the optical reading device. In accordance with a further concept of the invention, the coin 1 and the optical reading device represent a common optical system as in general the coins 1 are detected only with the type of reading device which is predetermined for same. The relief structures 8 perform optical functions in the sense that the coin 1, in the beam path of the reading device, behaves like a diffractive optical element which produces the image of the reading light beam 34 (FIG. 1), in a manner corresponding to the information coded in the relief structures 8, directly on a set of predetermined photodetectors in the reading device.

Figure 3A:
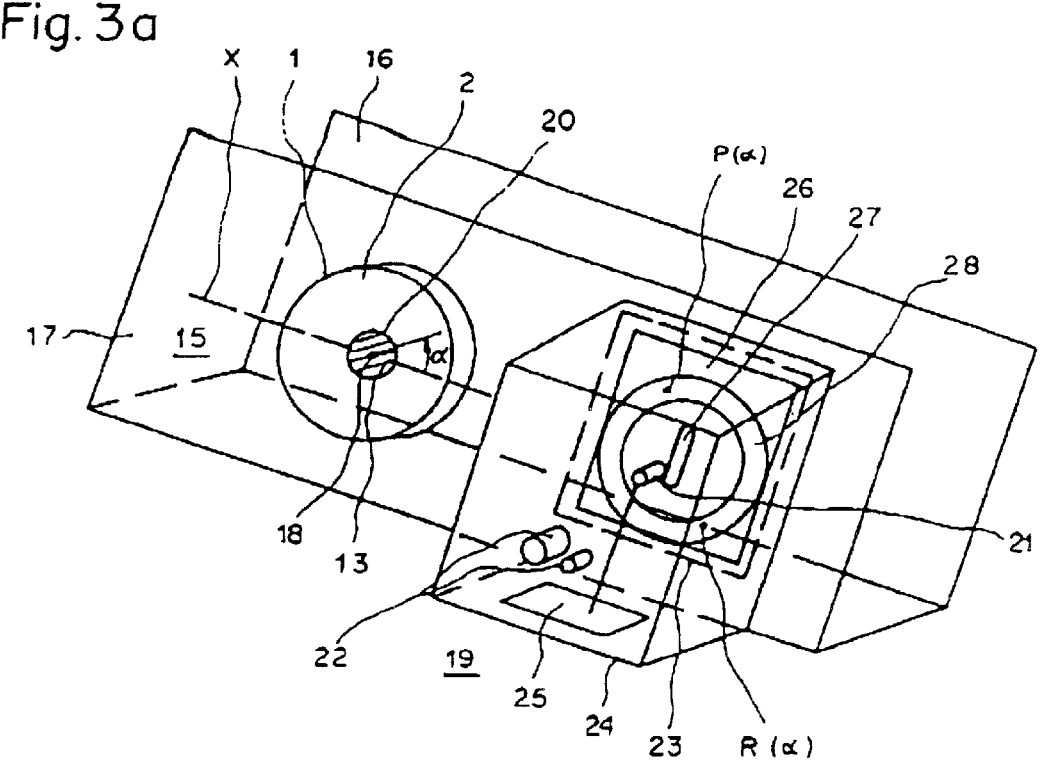
FIGS. 3a and 3b show a portion of a coin passage with an optical reading device.
Figure 3B:
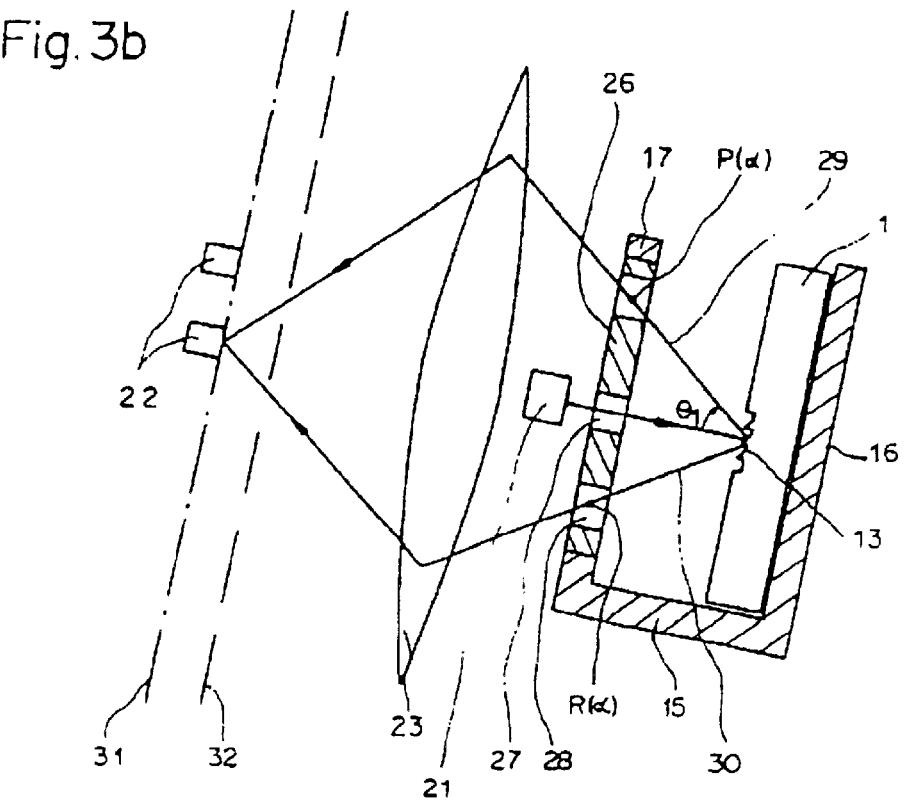

FIGS. 3a and 3b show a portion of a coin passage 15 of a coin tester. The coin passage 15 is inclined with respect to the vertical both in the direction of movement of the coin 1 (FIG. 3a) and also in a direction perpendicular thereto (FIG. 3b) so that the coin 1 rolls and/or slides down the coin passage 15 in a condition of bearing against a rear side wall 16 thereof. Fitted into a front side wall 17 of the coin passage 15 is an optical reading device 19 (FIG. 3a), wherein the side wall 17 serves at the same time as the front housing wall of the reading device 19.

The reading device 19 in FIG. 3a is suitable for machine detection of the authenticity of coins 1 which, on a surface portion 20 surrounding the center point 18 of the surface 2 or 3 respectively (FIG. 1), contain the microscopic relief structures 8 (FIG. 1) in the form of the single grating 13 with straight lines. The position of the lines with respect to the direction defined by the direction of travel of the coin 1 can be described by an angle α. When the coin 1 rolls along the coin passage 15 the angle α changes continuously. The center point 18 of the coin 1 moves along a straight line x while the other points of the coin 1 move along cycloids. The boundary of the surface portion 20 may be of any shape. In addition the surface portion 20 may be formed from areas which are not connected together. The macroscopic relief 5 (FIG. 1) of the coin 1 is not shown.

The reading device 19 includes a light source 21, for example a light emitting diode or a laser diode, photodetectors 22, an optical element 23, a housing portion 24 and an electronic circuit 25 for controlling the light source 21 and for evaluation of the signals supplied by the photodetectors 22. A plate portion serving as a mask 26, having a first opening 27, and further openings 28, is let into the front side wall 17. The light source 21 lights up the surface portion 20 through the opening 27 while the coin 1 is passing through the arrangement, with approximately monochromatic light of a wavelength λ. The opening 27 is preferably in the form of a slot so that the light spot which is incident on the coin 1 is a narrow strip, the width of which is somewhat greater than the largest dimension of the surface portion 20 and the length of which is such that the surface portion 20 of the coins 1 to be tested, of all desired kinds, are lit up as they pass through. The grating 13 in the surface portion 20 reflects a part of the incident light back as the zero diffraction order. The rest of the light, corresponding to the spatial frequency f of the grating 13, is reflected in the partial beams 29 (FIG. 3b) and 30 (FIG. 3b) at a predetermined angle $\theta_1$ (FIG. 3b) into the plus first and the minus first diffraction order and possibly also diffracted at different angles at higher diffraction orders. The partial beams 29, 30 pass two points P ($\alpha$) and R ($\alpha$) on the mask 26. The position of the points P ($\alpha$) and R ($\alpha$) for an individual coin 1 is given by the instantaneous value of the angle $\alpha$ during illumination of the surface portion 20 by the light source 21. The entirety of the points P ($\alpha$) and R ($\alpha$) which are possible for an individual kind of coin lies on a closed trajectory. Each of the openings 28 involves the configuration of the trajectory adapted to an associated kind of coin. By virtue of the mask 26, only light diffracted at the coin 1 goes to the photodetectors 22 while extraneous light and stray light are for the major part filtered out. For the sake of clarity, only the coin 1 of a single kind and only a single opening 28 are shown. By means of an optical system (not shown), the beam delivered by the light source 21 can be directed in such a way that the opening 27 is lit to the optimum extent making use of all of the light energy.

The optical element 23 provides that at least a part of the light of the partial beams 29, 30 passes on to the photodetectors 22. In one embodiment the optical element 23 is a diffuser plate which, in the passage through the arrangement, diffusely scatters the incident light of the partial beams 29, 30. Accordingly, a part of the light which is diffracted at the coin 1 is always incident on the single, suitably arranged photodetector 22. The electronic circuit 25 delivers a signal which indicates authenticity of the coin 1 if the level of intensity of the partial beams 29, 30, as measured by the photodetector 22, exceeds a predetermined threshold. In that case therefore the microscopic relief structure 8 serves solely as an authenticity feature.

In an embodiment of the reading device, connected upstream of the photodetectors 22 is an optical filter (not shown) for increasing the signal-noise ratio, which is only transmissive in respect of light of the predetermined wavelength $\lambda$. The housing portion 24 ensures that interference extraneous light does not impinge from the exterior on the photodetector 22.

As in FIG. 3b the optical element 23 can also be a lens which forms an image of the surface 2 (FIG. 3a) of the coin 1, which is towards the light source 21, in an image plane 31. The photodetectors 22 are now arranged in such a way that the image of the surface portion 20 of a first kind of coin is formed on the first photodetector 22, the image of the surface portion 20 of a second kind of coin of a different coin diameter is formed on the second photodetector 22, and so forth. The information relating to the kind of coin can thus be derived from the number of the photodetector 22 which delivers a positive authenticity signal.

Going back to FIG. 3a: the use of light beams 34 (FIG. 1) of different wavelengths $\lambda$, which are successively or simultaneously incident on the coin 1, considerably enhances the reliability of coin testing. In one embodiment of the light source 21, use is made of a light emitting diode which, with suitable actuation, emits light beams 34 of a first wavelength $\lambda_1$ or light beams 34 of a second different wavelength $\lambda_2$ (so-called dual color LEDs or three color LEDs). In an alternative embodiment the light source 21 includes two laser diodes which emit light of the wavelengths $\lambda_1$ and $\lambda_2$ respectively. The light source 21 is operated in such a way that it emits light of the wavelength $\lambda_1$ and $\lambda_2$ respectively in succession in respect of time. The electronic circuit 25 delivers an authenticity signal only when the ratio of the levels of intensity which are measured by the corresponding photodetector 22 and which are associated with the wavelengths $\lambda_1$ and $\lambda_2$ respectively lies within predetermined tolerance values. As the direction of the diffracted light is very sensitively dependent on the wavelength $\lambda$, errors caused by scratches or dust can be reduced. The coin 1 is genuine only when the photodetector 22 detects light of both wavelengths $\lambda_1$ and $\lambda_2$ respectively. In addition the ratio of intensity of the partial beams 29, 30 of the wavelength $\lambda_1$ in relation to the partial beams 29, 30 of the wavelength $\lambda_2$ is independent of the absolute light output which the light source 21 delivers. The use of two different wavelengths $\lambda_1$ and $\lambda_2$ also affords the advantage that the grating 13 with its diffraction effect cannot be replaced with intent to defraud by a reflecting structure.

Instead of the grating 13 with straight lines, it is also possible to use a grating 13 with circular lines which are concentric with respect to the center point 18 of the coin 1. That results in uniform illumination of the corresponding opening 28, which is independent of the angle $\alpha$.

A further diffraction structure is advantageously provided in the rear side wall 16 of the coin passage 15. Upon illumination with the light beam 34 of the light source 21, in the absence of the coin 1, the further diffraction structure diffracts light on to the photodetectors 22. In that way the light output of the light source 21 and the sensitivity of the photodetectors 22 can be checked at any time. The test result is advantageously to be taken into account when evaluating the signals.

If, as shown in FIG. 3b, the grating 13 of the coin 1 is of a linear asymmetrical profile shape, the photodetectors 22 are advantageously arranged in a plane 32 outside the image plane 31 where the partial beams 29 and 30 are spatially separate. As the angle $\alpha$ of the grating lines is statistically completely indefinite, the point of intersection of the partial beams 29 and 30 with the plane 32 lies somewhere on a circular ring whose center is on the optical axis of the lens 23. Instead of a plurality of discrete photodetectors 22, the arrangement preferably has a photodetector 22 which is subdivided into various light-sensitive sectors. The shape and dimensions of the sectors of the photodetector 22 are predetermined in such a way that the partial beam 29 and the partial beam 30 impinge on various sectors independently of the angle $\alpha$. When the coin 1 of a first kind passes through the assembly, a first sector and a second sector produce a signal which is above the threshold, while when the coin 1 of a second kind passes through the assembly a third sector and a fourth sector produce a signal which is above the threshold. The electronic circuit 25 is now adapted to test whether two different sectors associated with a kind of coin simultaneously deliver a signal which is above the threshold and whether possibly those signals involve a predetermined ratio. In that way the authenticity of the coin 1 can be verified on the basis of the ratio of intensity of the partial beams 29, 30, which is governed by the asymmetrical profile shape of the relief structures 8 (FIG. 1), which further enhances the level of security in relation to forgeries. In another embodiment of the reading device 19, instead of the photodetector 22 which is subdivided into light-sensitive sectors, the arrangement advantageously uses a two-dimensional 'Charge Coupled Device (=CCD)', as are known for example from digital photographic cameras or camcorders.

Instead of a single grating 13 it is also possible to provide on the coin 1 a plurality of gratings 13 which are arranged in mutually juxtaposed relationship or in superposed relationship and which are respectively turned through an angle 360°/k, wherein k denotes the number of the superimposed gratings 13. In that way the area to be covered by the photodetector 22 can be reduced in size.

Figure 4:
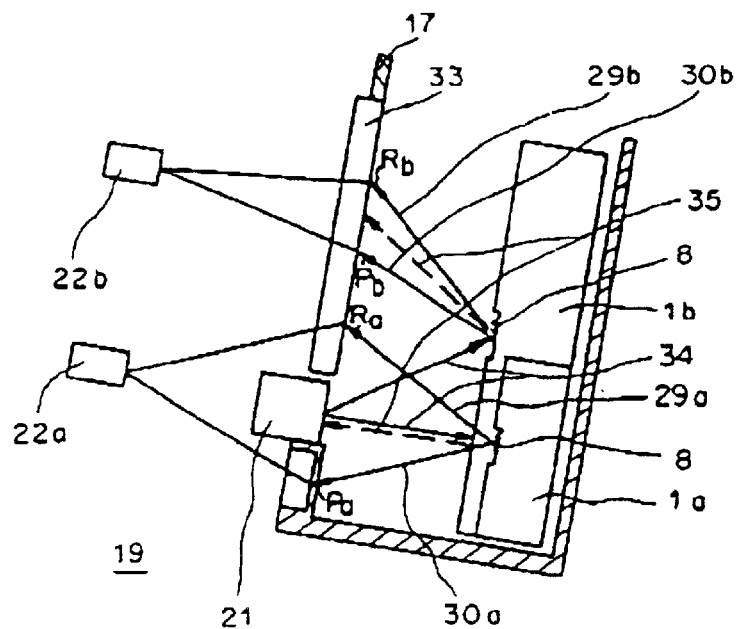
FIG. 4 shows the reading device in an embodiment with a diffractive optical element.

FIG. 4 shows the reading device 14 in a design configuration for testing coins 1 which are of different diameters. Instead of the mask 26 (FIG. 3b) and the lens 23 (FIG. 3b) the reading device includes a single, diffractive, optical element 33 which performs the functions of the mask 26 (FIG. 3b) and the lens 23 (FIG. 3b). The element 33 is either integrated flush into the front side wall 17 or it is arranged between the front side wall 17 and the photodetectors 22. The diffractive optical element 33 is for example a holographic optical element, a computer-generated hologram, a volume hologram, and so forth. The element 33 serves for deflection and focusing of the partial beams 29, 30 emanating from the coin 1 on to the photodetectors 22, in which respect the diffracted partial beams 29, 30 are focused by coins 1 of various kinds on to various photodetectors 22.

Two coins 1a and 1b of different diameters are shown. The light beam 34 emanating from the light source 22 is incident on the relief structure 8 of the coin 1a or 1b inclinedly at an angle corresponding to the diameter of the coins 1. The partial beams 29a, 30a or 29b, 30b respectively which are diffracted into the positive and negative diffraction orders are focused by the element 33 on to the photodetector 22a associated with the coin 1a of the first kind of coin and the photodetector 22b associated with the coin 1b of the second kind, independently of the instantaneous rotational position of the coin 1a or 1b respectively, as defined by the angle α. The beam 35 which is diffracted into the zero diffraction order is not deflected by the element 33 on to the photodetectors 22a, 22b.

Therefore the task of the element 33 is to deflect the partial beams 29a, 29b, 30a, 30b which are diffracted by the coins 1a and 1b and which are incident at a predetermined direction of incidence on to the element 33 at four different points $P_a$, $R_a$, $P_b$, $R_b$ into a reflection direction which is determined by the corresponding point $P_a$, $R_a$, $P_b$, $R_b$ and the spatial position of the photodetector 22a and 22b respectively. That task can be performed by a line grating whose grating line spacing and orientation are adapted locally to the wavelength λ and the deflection angle which is established by the incidence direction and the reflection direction. The direction of the partial beams 29a, 29b, 30a, 30b and the position of the points $P_a$, $R_a$, $P_b$, $R_b$ change with the instantaneous value of the angle α (FIG. 3a) which the coins 1a and 1b have during the measurement procedure. Accordingly the grating parameters vary along the trajectories described by the points $P_a$, $R_a$, $P_b$, $R_b$ in the plane of the diffractive optical element 33.

The number of photodetectors 22 present in the reading device 19 determines the number of various distinguishable relief structures 8 or gratings 13 (FIG. 3a) and thus the number of kinds of coin which can be distinguished.

If the asymmetry of the profile shape of the grating 13 is to be verified as an authenticity feature, then again each photodetector 22a, 22b is to be replaced by two photodetectors and the diffractive optical element 33 is to be so designed that the partial beams 29a, 30a and 29b, 30b respectively are focused on to different photodetectors.

The diffractive optical element 33 can be in the form of a body of any shape, in particular in the form of a flat plate. That permits inexpensive reproduction by embossing in thermoplastic material or by molding in for example UV-hardenable plastic material or by injection molding. In one embodiment the element 33 is a volume hologram which can also be easily reproduced, with the advantage of low levels of intensity losses in respect of the deflected partial beams 29, 30 as the volume hologram has a very high level of diffraction efficiency which can reach nearly 100%. By virtue of a design configuration which permits easy replacement of the element 33, the coin tester can be very easily adapted to a set of coins of a predetermined country or a plurality of predetermined countries.

Figure 5A:
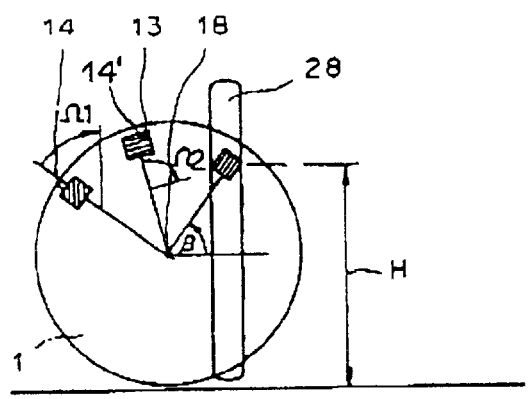
FIGS. 5a and 5b show the coin provided with a coding and the position of the gratings representing the coding in a slot-shaped opening in the reading device.
Figure 5B:
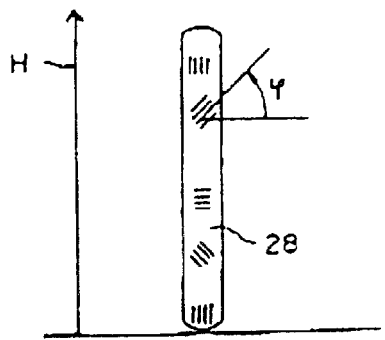

The diffractive optical element 33 can now be so designed that it is also possible to detect a code or identification on the coin 1. In the case of the coin 1 shown in FIG. 5a the fields 14, 14' are not arranged in the proximity of the center point 18 but within a circular ring along the rim around the center point 18. The fields 14, 14' contain the microscopic relief structure 8 in the form of the gratings 13 involving a predetermined spatial frequency f. The information which can be detected by the reading device 19 at a predetermined wavelength λ is contained in the sequence of profile shapes and/or azimuthal orientations $\Omega_1$, $\Omega_2$ of the gratings 13 in relation to the radial direction at the location of the field 14, 14', the relative azimuths $\Omega_1$, $\Omega_2$, as is shown in the drawing in FIG. 5a by lines in the fields 14, 14'. The light source 21 (FIG. 1) which is arranged laterally relative to the coin passage 15 (FIG. 3a) passes the light beam 34 (FIG. 4) through the slot-shaped opening 28 and illuminates on the coin 1 a chord which is at most of the width of a field 14, 14' or which is less than 1.5 mm wide. Each field 14, 14' passes the slot-shaped opening 28 at a height H which depends on the instantaneous value of a rolling angle β describing the rotational position of the coin 1. FIG. 5b diagrammatically shows in respect of a selected field 14 how the orientation φ of a grating 13 changes behind the opening 28 as a function of the height H. The angle φ is the sum of the rolling angle β and the relative azimuth Ω. Now, the diffractive optical element 33 in FIG. 5a is so designed that it deflects the partial beams 29 (FIG. 4) and 30 (FIG. 4) which are diffracted at the grating 13, for all possible heights H, corresponding to the orientation φ (H, Ω) of the gratings 13, at least on to a photodetector 22 associated with that grating 13. In the passage through the diffractive optical element 33 (FIG. 4) the element 33 therefore rotates a diffraction plane defined by the partial beams 29, 30 about an axis of rotation which is parallel to the light beams 34 (FIG. 4), in order to compensate the rolling angle β. In that way the image of the partial beams 29, 30 of the light which is diffracted at the field 14 and in respect of which the orientation of the grating 13 is of the relative azimuth $\Omega_1$ is formed on a first photodetector 22, while the image of the light diffracted at another field 14', in respect of which the orientation of the grating 13 is of the relative azimuth $\Omega_2$, is formed on a second photodetector 22. The sequence of the relative azimuths $\Omega_1$, $\Omega_2$ of the gratings 13 can also be determined from analysis of the variation in respect of time of the signals produced by the various photodetectors 22. From the sequence of the electrical signals from the photodetectors 22, which signals are proportional to the levels of intensity of the partial beams 29, 30, the circuit 25 (FIG. 3a) ascertains the sequence of the azimuthal orientations $\Omega_1$, $\Omega_2$ of the gratings 13 relative to the radial direction, which represents coding relating for example to the origin and value of the coin 1. In an embodiment the coins 1 of different countries differ from each other by virtue of the spatial frequency f used for the gratings 13, that is to say the identification relates only to the value of the coin. In another embodiment of the diffractive optical element 33 the reading device 19 is capable of distinguishing the grating 13 involving the symmetrical relief profile 8 from the gratings 13 with an asymmetrical relief profile 8 with the same relative azimuth Ω and the same spatial frequency f. The diffraction plane of the field 14, 14' illuminated in the opening 28, said plane being defined by the partial beams 29, 30 and the light beam 34 (FIG. 4), involves the azimuth Ω relative to the radial direction on the coin 1. Upon the passage of the diffracted light, the diffractive optical element 33 rotates in such a way that each of the two partial beams 29, 30 is focused on a photodetector 22 of a predetermined pair of the photodetectors 22, that is to say the diffractive optical element 33 rotates the diffraction plane defined by the partial beams 29, 30 reflected by the illuminated relief structure 8 through the angle φ (FIG. 5b) in the range −90° at the value of H which is at a maximum for the coin 1 to +90° at the value of H which is at a minimum for the coin 1, into a detector plane which is associated with the azimuth Ω and which is defined by the predetermined pair of the photodetectors 22 and the light beam 34. The partial beams 29, 30 of the field 14, 14' with the relative azimuth Ω impinge in the detector plane on the light-sensitive surfaces of the predetermined pair of photodetectors 22, irrespective of the rolling angle β of the coin 1 upon illumination of the field 14, 14'. The electrical circuit 25 ascertains the nature of the grating 13 with the relative azimuth Ω from the ratio of intensity of the electrical signals of the predetermined pair of photodetectors 22. The advantage of this embodiment of the element 33 lies in the enlargement of the extent of the coins 1 which are to be distinguished.

It is also possible for the arrangement of the fields 14, 14' to afford a bar code which is machine-readable, in which case the bar code is reconstructed from analysis in respect of time of the signal outputted by the associated photodetector 22. This arrangement may involve the use of a single grating 13 or also a plurality of gratings 13.

Figure 6A:
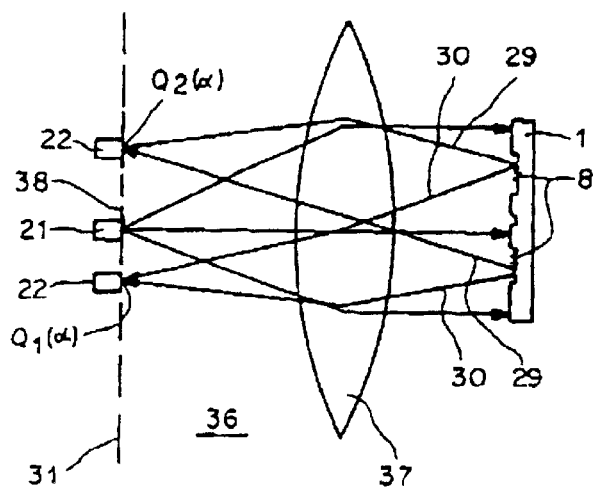
FIGS. 6a and 6b show a further optical reading device.
Figure 6B:
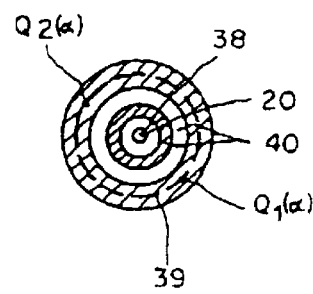

FIGS. 6a and 6b show the principle of a further reading device 36 which is suitable for the machine checking of coins 1, in respect of which the microscopic relief structures 8 are not arranged around the center point 18 (FIG. 5a) but anywhere on the coin 1. When the coin 1 rolls along the coin passage 15 (FIG. 3) those relief structures 8 describe cycloidal paths. In FIG. 6a the reading device 36 includes a lens 37, at the one focal point 38 of which is disposed the single light source 21. The lens 37 serves on the one hand to illuminate the coin 1 as it passes through the arrangement, with light which is directed in parallel relationship and which involves perpendicular incidence. The diameter of the light beam 34 (FIG. 1) which is incident on the coin 1 is at least so great that the relief structures 8 of the coins 1 to be tested are illuminated. The image of the light diffracted at the relief structures 8 in the form of gratings 13 (FIG. 3b), being the partial beams 29, 30, is now on the other hand formed by the lens 37, in accordance with the instantaneous value of the angle α (FIG. 3a) and the grating line spacing, on given points $Q_1$ (α) and $Q_2$ (α), in the focal plane 31 of the lens 37. The totality of the points $Q_1$ (α) and $Q_2$ (α) which are possible for all angles α of a grating 13 thus lies on a circle 39 (FIG. 6b). The photodetector or photodetectors 32 are also disposed in the focal plane 31 which is here identical to the Fourier plane. As shown in FIG. 6b the photodetectors 22 are in the form of circular rings 30 which are concentric with respect to the focal point 38. This construction as shown in FIG. 6a affords the advantage that the location of the grating 13 on the coin 1 and the location of the coin 1 itself, for example when the coin 1 bounces in the coin passage 15 (FIG. 3a), play no part in terms of detection of the relief structures 8. As the coin 1 rolls along the angle α changes and the points $Q_1$ (α) and $Q_2$ (α) thus also move. If the lens 37 illuminates the coin 1 over a certain distance and if there is more than one photodetector 22 per circular ring 39 (FIG. 6b) and 40 (FIG. 6b) respectively it is possible to follow the movement of the points $Q_1$ (α) and $Q_2$ (α). The photodetectors 22 can be for example in the form of a two-dimensional CCD-device with many light-sensitive cells.

If the coins 1 are coded by each coin 1 having the number of N fields 14 (FIG. 2), in which respect the gratings 13 of the fields 14 differ in respect of their grating line spacing, that is to say the spatial frequency f, then the points $Q_1$ (α) and $Q_2$ (α) for each grating lie on a different circular ring 39, 40. The electronic circuit 25 (FIG. 3a) detects the identification of the coins 1 from the electrical signals of the photodetectors 22 associated with the various circular rings 39, 40.

In another embodiment of such a reading device 37, only one one-dimensional array of photodetectors 22 is arranged in the focal plane 31. The coin 1 is illuminated over a certain distance so that the path of the point $Q_1$ (α) or $Q_2$ (α) impinges on the corresponding photodetector 22 definedly at a point on the path.

In another embodiment the microscopically fine relief structures 8 of the coin 1 are such that the surface 2 (FIG. 1), 3 (FIG. 1) of the coin 1 acts like a diffractive optical element, for example a Fresnel lens. The diffractive optical element then serves both as a machine-checkable authenticity feature and also as an image-forming element which forms an image of a laser light beam of the reading device on a predetermined photodetector. The diffractive optical element can be arranged on a single interconnected surface or distributed over a plurality of separate fields 14, 14'. In the case of the Fresnel lens therefore it is certainly satisfactory if the surface of the Fresnel lens is only partially formed with the relief structure 8. Accordingly the graphic representation of the coin surface 2, 3 with the macroscopic reliefs 5 (FIG. 1) is not subjected to any limitations. The totality of the diffractive structures of the optical element however is advantageously of an axially symmetrical nature with respect to the center point 18 (FIG. 5a) of the coin 1 so that the imaging properties of the optical element are independent of the instantaneous rotational position of the coin 1. For example, the relief structures 8 which are designed in that way can illuminate circular bands which are rotationally invariant, with respect to an axis which passes perpendicularly through the center point of the coin 1, in a provided image plane, when they are irradiated with parallel light. A suitable arrangement for reading such a structure is for example a reading device similar to the reading device 36, in which illumination of the coin surface 2, 3 is effected using parallel light.

Figure 7A:
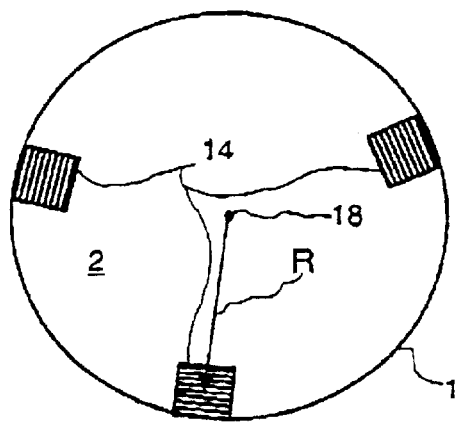
FIGS. 7a and 7b show the coins with arrangement of fields with relief structures.
Figure 7B:
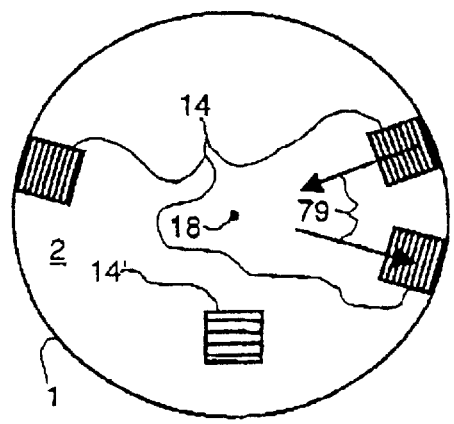

FIGS. 7a and 7b show another embodiment of the coins 1 in which the N fields 14 are at a predetermined spacing relative to the center point 18 of the coin 1. In the example of FIG. 7a three fields 14 are at the same spacing in relation to the center point 18 of the coin 1. In the example of FIG. 7b at least one of the fields 14' is arranged at a different spacing relative to the center point 18 of the coin 1. The number N of the fields 14, 14' is only limited by the available space on the surface 2 or 3 respectively (FIG. 1). The field 14, 14' is occupied by a relief structure 8 (FIG. 1) and involves an area in the range of between 0.5 mm² and 10 mm², with the typical size being 1 mm². The lines or grooves of the relief structure 8 are oriented perpendicularly to the radial connecting line between the center point 18 of the coin 1 and the center point of the respective field 14, 14', in such a way that the grating vectors 79 face in a radial direction. The relief structures 8 can form linear gratings 13 (FIG. 2) or can be curved in such a way that the lines of the gratings 13 in the field 14, 14' form circular arcs about the center point 18 of the coin 1. The circular arcs involve the radial spacing R which is determined by the spacing of the center point of the field 14 from the center point 18 of the coin 1, or the radii which are determined by the spacing of the individual grooves from the center point 18 of the coin 1. The other parameters of the relief structure 8, such as for example spatial frequency f, profile shape and so forth, depend on the location of the field 14 on the coin 1 and the configuration of the reader 36 in FIG. 8.

The following boundary condition is advantageously met: the relief structures 8 which are illuminated by means of the light source 21 (FIG. 6a) in point form, which is arranged perpendicularly above the center point 18 of the coin 1, diffract the light in such a way that one of the two partial beams 29, 30 intersects a perpendicular through the center point 18 of the coin 1, at a predetermined spacing relative to the surface 2 or 3 (FIG. 1). All gratings 13 which intersect the perpendicular at the same spacing form a group. A number M of groups permit identification of the coins 1 with the relief structures 8 which satisfy that boundary condition. The identification can be tested in a rotationally invariant fashion, that is to say, the coding can be read out independently without further aids of the instantaneous value of the rolling angle β (FIG. 5a) which describes the rotational position of the coin 1 as it rolls in the coin passage 15 (FIG. 3).

Figure 8:
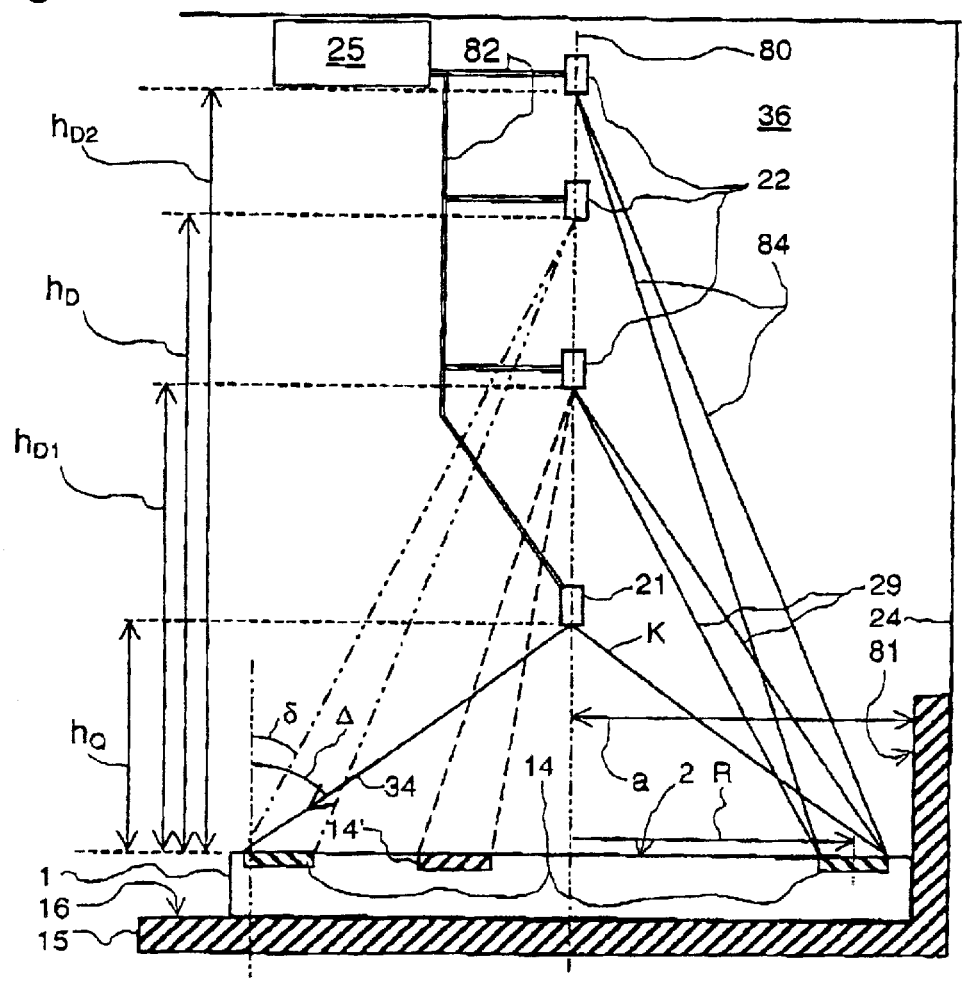
FIG. 8 is a view in cross-section through a further embodiment of the reading device.

FIG. 8 shows an embodiment of the reading device 36 for the coins 1 (FIGS. 7a and 7b), which is suitable for a rotationally invariant testing operation. The reading device 36 has an optical axis 80 which is oriented perpendicularly on to the rear side wall 16 of the coin passage 15 in such a way that, at the moment of the testing operation, the optical axis 80 passes perpendicularly through the center point 18 of the coin 1 as it rolls in the coin passage 15. Besides the electronic circuit 25 the reading device 36, on the optical axis 80, has at least one light source 21 in point form at a spacing $h_Q$ and at least one photodetector 22 at a second spacing $h_D$, from the center point 18 of the coin 1. The locations of the light source 21 and the photodetector 22 on the optical axis 80 are interchangeable in themselves, but they determine the parameters of the relief structures 8 on the coins 1. The light source 21 and the photodetectors 22 are connected by way of lines 82 to the electronic control circuit 25. A practical embodiment of the light source 21 in point form emits light in a spatial angle which is directed towards the optical axis 80 and which is delimited by a notional circular cone K, in such a way that the entire surface 2 of the coin 1, which faces towards the light source 21, is illuminated. In specific cases aperture members (not shown here) which are rotationally symmetrical with respect to the optical axis 80 are arranged between the light source 21 and the surface 2 and/or in relation to the radial boundary of the partial beams 29, 84 between the surface 2 of the coin 1 and the photodetectors 22, in order to reduce the stray light. The housing portion 24 keeps out extraneous light.

The spacing $h_D$ is determined by the intersection of the light diffracted at the fields 14, 14', the partial beams 29, with the optical axis 80. The spacings $h_Q$ and $h_D$ and the radial spacing R of the field 14 or 14' respectively determine the angle of incidence Δ and the diffraction angle δ, wherein Δ denotes the angle of the light beam which is incident on the field 14, 14' from the light source 21 in point form, and δ denotes the angle of the light diffracted at the relief structures 8 (FIG. 1) of the field 14, 14', the partial beams 29 and 84 respectively. The two angles Δ and δ are measured in relation to the perpendicular to the respective field 14, 14'. The grating equation $\sin(\delta)=\sin(\Delta)+k*\lambda*f$ serves for calculation of the spatial frequency f. For a predetermined arrangement of the light source 21 and the photodetectors 22, the spatial frequency f is dependent only on the wavelength λ of the light source 21, the radial spacing R and the diffraction order k. The N fields 14, 14' with the relief structures 8 satisfying the conditions of this paragraph are arranged for example in a band 83 (FIG. 2), for example parallel to the rim of the coin 1 in the protection afforded by the rim ridge and/or in the recesses 7 (FIG. 1) in the pattern of the macroscopic relief 5 (FIG. 1) and so forth. The fields 14, 14' are inconspicuously distributed over the graphic motive or pattern of the coin 1, in another design configuration. The fields 14, 14' are defined by simple geometrical shapes or characters like the surfaces 10 (FIG. 2) and 11 (FIG. 2). The N fields 14, 14' are read out simultaneously by the reading device 36 independently of the distribution thereof on one of the surfaces 2, 3 (FIG. 1). The reading device 36 produces a signal which is characteristic of the coin 1 from the pattern of the diffracted light by means of the photodetectors 22 and the electronic circuit 25.

As the two angles Δ and δ within a field 14, 14' change with the radial spacing R, the spatial frequency f advantageously increases within a field 14, 14' in accordance with the increase in the radial spacing R of the grooves of the relief structure 8. The parameters of the relief structures 8 are so selected that the diffracted light at the wavelength λ intersects the optical axis 80 at the spacing $h_D$. The intensity of the light which is incident on the photodetector 22 arranged at the spacing $h_D$ is proportional to the content in relation to area of one or more fields 14, 14' which diffract the light to the same photodetector 22. The coins 1 are distinguished by a coding with N fields 14, 14' with the relief structures 8 which diffract light incident on the relief structures 8 in a predetermined manner in such a way that the diffracted light intersects the optical axis 80 at one of the predetermined spacings $h_D$ above the center point 18 of the coin 1.

The photodetectors 22 are arranged on the optical axis 80 in such a way that the partial beams 29 and 84 respectively are concentrated on to the light-sensitive surface of the photodetector 22 arranged at the predetermined spacing $h_D$ and are there converted into an electrical signal in proportion to the level of intensity of the partial beams 29, 84. The electrical signals are outputted to the electronic control circuit 25, in which respect the control circuit 25 is so designed that it can recognise a coin 1 from a predetermined set of coins 1, from the commands directed to the light source 21 in respect of wavelength λ and the intensity of the emitted light and the electrical signals which are received as a response from the photodetectors 22.

In an improved embodiment of the reading device 36, the light source 21 in point form is capable of emitting light whose wavelength is switched over between predetermined values $\lambda_1$, $\lambda_2$ and so forth during the testing operation. The light source 21 can be for example a light emitting diode or a laser diode which, according to the actuation thereof, emits a monochromatic light at one or other of the wavelengths $\lambda_1$, $\lambda_2$ etc. A respective photodetector 22 is disposed on the optical axis 80 at given spacings $h_D$, $h_{D1}$, $h_{D2}$ and so forth. Provided for each of the wavelengths $\lambda_1$, $\lambda_2$ and so forth is a group of relief structures (FIG. 1), such that each relief structure 8 deflects the diffracted light on to the photodetector 22 associated therewith. Given relief structures 8 diffract light of the wavelength $\lambda_1$ to the first photodetector 22 and light of the wavelength $\lambda_2$ to the second photodetector 22. While the light source 21 emits light of the wavelength $\lambda_1$, by way of example the first photodetector 22, at the spacing $h_{D1}$, receives the light diffracted at the given relief structure 8 in one of the fields 14, with the partial beams 29, as soon as the optical axis 80 comes into the immediate proximity of the center point 18 of the genuine coin 1. If the light source 21 changes in relation to the second wavelength $\lambda_2$, the given relief structures 8 project the diffracted light, the partial beams 84, on to the second photodetector 22 which is arranged at the spacing $h_{D2}$ on the optical axis 80. The reading device 36 which operates with at least two different wavelengths $\lambda_1$, $\lambda_2$ and so forth makes it possible, when dealing with the coins 1 which have a field 14 or 14' with the given relief structure 8, to reliably distinguish light beams reflected into the photodetectors 22 at randomly correctly inclined surfaces of the macroscopic relief 5 (FIG. 1), and the diffracted light 29, 84, as well as making it possible to check the photodetectors 22. A field 14 or 14' with the given relief structure 8 therefore forms an authenticity feature for the coin 1. The operation of switching over from one wavelength to the other by the electronic control circuit 25 is effected extremely quickly in particular when using light emitting diodes or laser diodes, so that the coin 1 rolling in the coin passage 15 can be assumed to be at rest at the location of the optical axis 80, although the conditions for reading off the coding or the authenticity feature are satisfied only in the period of time for which the optical axis 80 passes through the coin 1 at the center point 18.

The coins 1 are coded in accordance with the coin value and/or the issuing authority, in which respect the number N of fields 14, 14', the extent m of the sets of relief structures 8, the number M of photodetectors 22, the number of intensity stages which can be detected by the photodetectors 22 and the number of available wavelengths $\lambda_{1,2}$ establish the extent of the coins 1 which can be distinguished. A zero element forms a field 14 or 14' without one of the relief structures 8.

A simple form of coding is described hereinafter. Upon illumination of the coin 1 by the light source 21 in point form with light of a wavelength $\lambda$, a first group of the fields 14 reflects the diffracted light, the partial beams 29, on to the photodetector 22 at the spacing $h_{D1}$, while at the same time another group of the fields 14 reflects the diffracted light, the partial beams 84, on to the photodetector at the spacing $h_{D2}$. With that arrangement, it is possible to distinguish $2^M-1$ kinds of coin, that is to say for M=2, three kinds of coin involving the same dimensions, from each other, wherein the first kind of coin produces a signal only in the photodetector 22 at the spacing $h_{D1}$, the second kind of coin produces a signal only in the photodetector at the spacing $h_{D2}$ and the third kind of coin simultaneously produces the signal in both photodetectors 22. A coin 1 which cannot reflect any diffracted light 29, 84 into one of the two photodetectors 22 and which therefore cannot produce any signal in at least one of the two photodetectors 22 is rejected. The principle of simple coding of the coins 1, which has been illustrated by means of the example of two photodetectors 22 and two relief structures 8 with at least two fields 14, 14', can be expanded to any number of kinds of coin which is limited only by the viable level of expenditure in terms of manufacture of the coins 1 and the level of expenditure in respect of the reading device 36.

As each coin 1 is of a given diameter according to its value, the above-described reading device 36 can recognise only those coins 1 whose radius is equal to the spacing a of the optical axis 80 from the rolling surface 81 of the coin passage 15. Therefore, in order to recognise an entire set of coins 1, a reading device 36 is to be provided for each coin diameter. The optical axes 80 of the reading devices 36 are parallel and are at the spacings a from the rolling surface 81 of the coin passage 15, which are equal to the radii of the coin 1 of the denominations in question. The simplicity of design of the reading devices 36 makes it possible to assemble a testing arrangement with the appropriate number of reading devices 36, occupying a very small amount of space, at a good price.

For the sake of completeness, reference is made herein to a variant of the structure of the light source 21 which has a light emitting diode or laser diode for each wavelength $\lambda_1$, $\lambda_2$ and so forth, wherein the light beams of each light emitting diode or laser diode are coupled by optical means into the optical axis 80 and the color of the light emitted by the light source 21 is controlled by switching on one or more light emitting diodes. In another embodiment of the reading device 36, instead of a single light source 21 involving emitted light of a wavelength $\lambda$ which can be switched over, a plurality of light sources 21 involving different wavelengths $\lambda_1$, $\lambda_2$ and so forth of the emitted light are arranged together with the photodetectors 22 on the same optical axis 80. In a further embodiment of the reading device 36 a plurality of optical axes 80 with a light source 21 and the associated photodetectors 22 are arranged in parallel relationship and are at the same spacing a relative to the rolling surface 81. The light source 21 and the associated photodetectors 22 take up only a small amount of space so that the optical axes 80 are spaced a few millimeters, for example fewer than 5 mm, along the coin passage 15. From the point of view of the amount of space required therefore the reading device 36 can be easily installed in a conventional coin tester involving inductive sensors.

A further possible way of further enhancing the reliability of the coin testing procedure involves the provision on the coin 1 of a field 14 having a grating 13 serving as a reference grating. In the reading device 19 or 36, a photodetector 22 is associated with the reference grating and the intensity of the light which is incident on that photodetector 22 and which is diffracted at the reference grating serves as a reference intensity, for example for determining the threshold referred to hereinbefore.

It is also possible to increase the number of coding options with a predetermined number of photodetectors 22, in which case a plurality of fields 14, 14' project their partial beams 29, 84 on to the same photodetector 22. The electronic circuit 25 recognises the levels of intensity of the diffracted light from the level of the electrical signals of the photodetectors 22. Each distinguishable level corresponds to a different coding value.

In order to make it still more difficult to implement attempts at fraud, it is advantageous for the optical-diffraction coin testing procedures described herein to be combined together, in which respect they can additionally be supplemented by per se known optical (see for example EP 0 694 888 B1), magnetic (see for example European patent application EP 0 704 825 A1) or other testing methods which give information about the geometry and the material properties of the coin 1.

Various methods are possible for manufacture of the microscopic relief structures 8 (FIG. 1). The embossing method is known for relatively soft-metallic surfaces such as for example gold. Described hereinafter are methods involving lasers which are also suitable for harder metal surfaces 2, 3. A further method involves etching the microscopic relief structures 8 into the material surface 2, 3.

Figure 9:
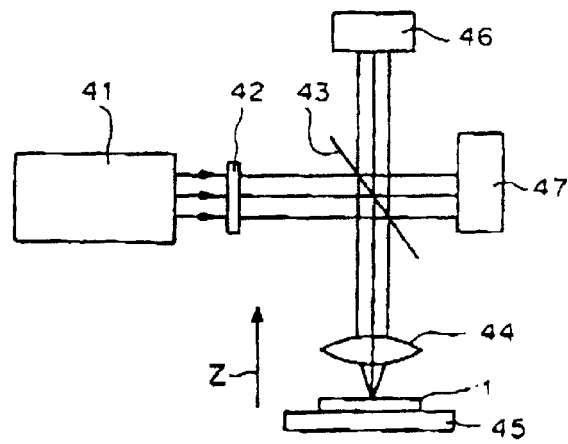
FIG. 9 shows a first device for producing a microscopic relief structure.

FIG. 9 shows a first device for the manufacture of the microscopic relief structure 8 (FIG. 1) on the coin 1 or another comparatively hard material surface 2 (FIG. 1), 3 (FIG. 1), for example an embossing die or another metal article. The device has a laser 41, a mask 42, a partially transmissive mirror 43, an image-forming optical system 44, a holding device 45, an adjusting device 46 and a device 47 for beam diagnostics. The coin 1 to be provided with the relief structure 8 is held by the holding device 45. The precise position of the coin 1 is detected by means of the adjusting device 46 and in particular the z-position is regulated to a predetermined value. The mask 42 is illuminated by the laser 41. The image of the mask 42 is produced on the coin 1 on a reduced scale by means of the image-forming optical system 44. A typical reduction is 15:1. By virtue of the 15-times reduction, the light output incident on the mask 42 is less by a factor of 225 than the light output incident on the coin 1, whereby it is possible to locally remove material on the coin 1 without material being removed from the mask 42. Let the distribution of intensity of the beam emitted by the laser 41, in a yz-plane parallel to the mask 42, be $i_0(y,z)$ in front of the mask, and let the transmission function of the mask 42 be $t(y,z)$. The distribution of intensity after the mask 42 is then $I(y,z)=t(y,z)*I_0(y,z)$. Besides the form of the intensity distribution $I(x,y)$ incident on the coin 1, the profile form of the relief structure 8 also depends on further factors such as absorption coefficient, thermal conductivity, thermal diffusion capability, melting temperature and possibly band gap of the material selected for the surface of the coin 1. The profile form therefore depends in particular on whether the situation involves only a single exposure or a plurality of exposures at a suitable time spacing. As a high level of light output is required in order to be able to remove metal material, the laser 41 is advantageously a pulsed excimer laser or a solid-state laser.

Figure 10:
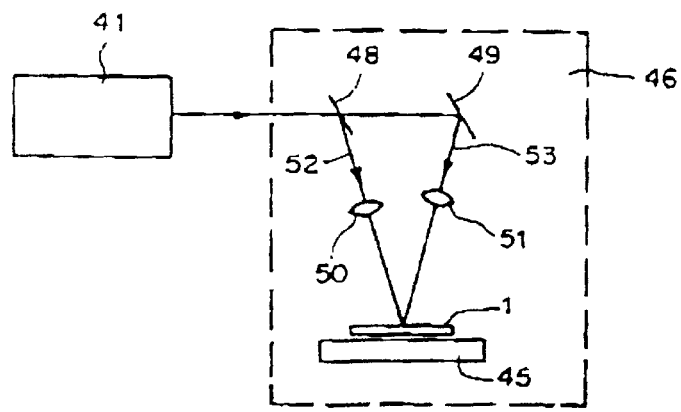
FIG. 10 shows a second device for producing the microscopic relief structure.

FIG. 10 shows a further device for manufacture of the microscopic relief structure 8 on the coin 1. The device has a laser 41, a beam splitter 48, a mirror 49, focusing optical systems 50, 51, the holding device 45 and the adjusting device 46. By means of the beam splitter 48 and the mirror 49, the arrangement produces two beams 52, 53 which are incident on the surface of the coin 1 inclinedly at different angles. If the wave vector $k_1$ and the amplitude $I_1$ are associated with the first beam 52 and the wave vector $k_2$ and the amplitude $I_2$ are associated with the second beam 53, and the phase of the first beam 52 $\phi 1$ and the phase of the second beam 53 $\phi 2$ are at the location r on the coin 1, then the intensity is $I(r)=I_1+I_2+2*\sqrt{I_1}*I_2*\cos \Delta\phi$ with $\Delta\phi=(k_1-k_2)*r+\phi_1-\phi_2$. This method is known as the dual beam interference method. In order to embody more complex relief structures 8 (FIG. 1) in the metal surface of the coin 1, the coin 1 is repeatedly exposed with a laser pulse, wherein the orientation of the coin 1 and also the direction of the wave vectors $k_1$ and $k_2$ are varied by spatial adjustment of the components 48, 49, 50, 51. Any profile form, for example a sawtooth shape, can be implemented by the direction of the wave vectors $k_1$ and $k_2$ for a number n of successive exposure pulses being so adjusted that the respective interference terms $I_n(r)$ behave like the coefficients of the corresponding Fourier series. Upon exposure with extremely short light pulses the position of the beam splitter 48 and the mirror 49, which position determines the geometry of the beams 52, 53, is carefully matched to each other so that the travel difference of the two beams 52, 53 is less than the coherence length of the light emitted by the laser 41.

It is possible for the devices shown in FIGS. 9 and 10 to be combined. The mask 42 can be a spatial light modulator (SLM) with individually addressable pixels so that the microscopic relief structure 8 to be produced on the coin 1 can be varied under computer control in a simple manner. Each pixel is at least partially transparent or approximately opaque, according to the mode of actuation involved. In that way it is possible for example to produce a grating with a high number of lines and a well-defined boundary. By means of this device, each coin 1 can be provided with an individual relief structure 8 which for example can contain a serial number in coded form. The high output of the laser 41 permits a high rate of throughput of coins 1 at an inexpensive price.

The two laser methods described can also be used to apply optical-diffraction relief structures 8 as proof of authenticity to material surfaces other than those of coins. Particular reference may be made here to clocks and watches, jewellery, replacement parts or components with metal surfaces, in particular of gold, brass, steel, titanium, aluminum, copper-nickel alloys, and so forth, or with ceramic surfaces. This technology can be used in particular in relation to semiconductor chips with integrated circuits, in which respect after successful conclusion of the functional testing procedure the proof of authenticity with optical-diffraction relief structures 8 is produced in the surface of the material, for example at the rear of the semiconductor chip, by one of the above-described methods of material removal.

In an etching method, the article which is to be provided with microscopic relief structures 8, for example the coin 1, is coated for example in an immersion bath with a thin, light-sensitive layer of plastic material. The thickness of that layer of plastic material is in the range of from some hundred to some thousand nanometers. The procedure then involves exposure and development of the layer of plastic material so that microscopically fine locations on the surface of the coin are made free of plastic material. Then, in an etching bath, microscopic relief structures 8 are etched into the surface of the coin. To conclude, the remaining plastic material is removed again.

These methods are also suitable for forming the negative shape of the microscopic relief structures 8 in an embossing die already provided with the negative shape of the macroscopic relief 5 (FIG. 1), thereby to emboss the reliefs directly into the surface of the material of a blank. In another embodiment of FIG. 1, instead of the relief structures 8 which are formed directly in the metal, use is made of the relief structures 8 which are molded in plastic material. For example, suitable portions from a laminate of plastic layers which enclose the relief structures coated with a reflection layer are glued on the bottom of the recesses 7. A foil which can be used for that purpose is described in EP 401 466.

In an optional last step in the method the protective lacquer 9 (FIG. 1) is applied to the relief structures 8 of the coins 1. In the case of the embossing die which is provided with the negative, produced in accordance with the above-described methods, of the structures to be formed in the surface 2 or 3 respectively of the material to be embossed, the last step in the method involves hardening of the embossing die by a per se known method, such as for example nitriding, and so forth.

What is claimed is:
1. A coin having a metal surface structured with macroscopic reliefs for the representation of motifs which serve to specify the coin value and as a recognition feature, and fields of the surface, which are arranged on a circular ring around the center point of the coin and which have microscopically fine relief structures with a diffraction action and which form an optically machine-readable identification, wherein the relief structures in the fields are gratings which are of the same spatial frequency (f), and that the relief structures differ by their azimuth ($\Omega$) relative to the radial direction and/or by a symmetrical or asymmetrical relief profile.

2. A method of applying a microscopic relief structure to a coin as set forth in claim 1, wherein said coin has a comparatively hard material surface, said method comprising:

applying a thin light-sensitive plastic material layer to the material surface, exposing and developing the plastic material layer so that microscopically fine locations of the material surface are free of plastic material, etching the material surface, with the microscopic relief structure being formed, and removing the plastic material layer.

3. A coin as set forth in claim 1 wherein the macroscopic relief structures are arranged on the bottom of recesses let into the surface of the coin.

4. A coin as set forth in claim 3 wherein arranged in the recesses is a suitable portion of a plastic material laminate containing the relief structures.

5. A coin as set forth in claim 1, wherein the microscopic relief structures are formed directly in the surface in the fields.

6. A coin as set forth in claim 1, wherein the microscopic relief structures are covered over with a transparent protective lacquer which fills the grooves of the relief structures.

7. A coin tester for testing a coin as set forth in claim 1, said coin tester comprising a reading device which includes light sources, photodetectors and an electronic circuit connected to the light sources and the photodetectors and which is adapted for machine checking of the identification with relief structures of the coin rolling or sliding in a coin passage on a rolling surface, wherein a light source is arranged for illuminating a surface of the coin with approximately monochromatic light laterally in relation to the coin passage, that a chord of the corn which is 1.5 mm wide maximum and which is perpendicular to the rolling plane is illuminated with the perpendicularly incident light beams, that at least one photodetector is associated with each relative azimuth ($\Omega$) of the gratings, which is admissible for identification of the coins, that a diffractive optical element for deflection of partial beams of the diffracted light of a field illuminated in the region of the chord at the height (H) is arranged between the coin passage and the photodetectors and that the diffractive optical element is adapted to rotate the diffraction plane defined by the partial beams through a rolling angle ($\beta$) dependent on the height (H) with an axis of rotation parallel to the light beams upon the passage through the diffractive optical element, in such a way that after said passage the partial beams are oriented on to at least one photodetector associated with the azimuth ($\Omega$).

8. A coin tester as set forth in claim 7 wherein a pair of photodetectors is associated with each admissible relative azimuth ($\Omega$), that after rotation of the diffraction plane to compensate for the rolling angle ($\beta$) each of the two partial beams is oriented on to one of the two photodetectors of the pair associated with the predetermined relative azimuth ($\Omega$), and that the electronic circuit is adapted by way of the photodetectors to detect asymmetry of the intensity of the two partial beams.

9. A coin tester as set forth in claim 7, wherein the monochromatic light beam from the light source is of a wavelength ($\lambda$) from a number of predetermined wavelengths ($\lambda_1, \lambda_2$), and that a command of the electronic circuit to the light source determines the wavelength ($\lambda$) of the emitted light beam.

10. A method of applying a microscopic relief structure to a coin as set forth in claim 1, wherein said coin has a comparatively hard material surface, and wherein the microscopic relief structure is produced by the removal of material by means of exposure of the material surface with a laser beam.

11. A method as set forth in claim 10, wherein the material surface with the previously produced relief structures is hardened by nitriding.

12. A method as set forth in claim 10 wherein the laser beam passes a mask determining the form of the microscopic relief structure and then an optical image-forming system for reduction purposes.

13. A method as set forth in claim 10 wherein the laser in accordance with the method of dual beam interference produces on the material surface a microscopically fine interference pattern of a predetermined, spatial frequency (f) and the material of the surface is removed at the locations of increased intensity in the interference pattern to produce the microscopic relief structure.

14. A coin having a metal surface structured with macroscopic reliefs for the representation of motifs which serve to specify the coin value and as a recognition feature, and fields of the surface, of which at least one has a microscopically fine relief structure with a diffraction action and which form an optically machine-readable identification, wherein the relief structures of the identification are selected from M groups of gratings, that the grating vectors of all gratings of the M groups are radially oriented, that in each of the M groups the spatial frequency (f) of the relief structure is selected in dependence on the radial spacing (R) of the field from the center point of the coin such that upon illumination of the relief structure by means of a light source in point form arranged perpendicularly above the center point, with the wavelength ($\lambda$), one of the two partial beams of the diffracted light crosses the center point at a spacing ($h_D$) which is predetermined for said group.

15. A coin tester for testing a coin as set forth in claim 14, said coin tester comprising a reading device which includes light sources, photodetectors and an electronic circuit connected to the light sources and the photodetectors and which is adapted for machine checking of the identification with relief structures of the coin rolling or sliding in a coin passage on a rolling surface, wherein an optical axis of the reading device is established by at least one photodetector and at least one light source in point form, that the optical axis is oriented perpendicularly with respect to a side wall of the coin passage and is at a spacing (a) from the rolling surface, which corresponds to the radius of the coin to be tested, that the light source is arranged at a spacing ($h_Q$) and each photodetector is arranged at a spacing ($h_D$) from the surface of the coin such that monochromatic light of the wavelength $\lambda$ emitted by the light source is diffracted by at least one relief structure of the coin to be tested as a partial beam towards the optical axis and is concentrated on the predetermined photodetector arranged at the spacing ($h_D$), and that the electronic circuit is adapted to recognise the passage of the center point of the coin through the optical axis and the authenticity of the coin from the electrical signals of the photodetectors, which signals are proportional to the intensity of the partial beam.

16. A method of applying a microscopic relief structure to a coin as set forth in claim 14, wherein said coin has a comparatively hard material surface, and wherein the microscopic relief structure is produced by the removal of material by means of exposure of the material surface with a laser beam.

17. A method of applying a microscopic relief structure to a coin as set forth in claim 14, wherein said coin has a comparatively hard material surface, said method comprising:

applying a thin light-sensitive plastic material layer to the material surface, exposing and developing the plastic material layer so that microscopically fine locations of the material surface are free of plastic material, etching the material surface, with the microscopic relief structure being formed, and removing the plastic material layer.

\* \* \* \* \*

UNITED STATES PATENT AND TRADEMARK OFFICE
CERTIFICATE OF CORRECTION

PATENT NO. : 6,871,788 B2  Page 1 of 1
DATED : March 29, 2005
INVENTOR(S) : Tompkin et al.

It is certified that error appears in the above-identified patent and that said Letters Patent is hereby corrected as shown below:

<u>Column 7,</u>
Line 28, now reads "detector 22a associated with the coin la of the first kind of" should read -- detector 22a associated with the coin 1a of the first kind of --
Line 43, now reads "passage, that a chord of the corn which is 1.5 mm wide" should read -- passage, that a chord of the coin which is 1.5 mm wide --

Signed and Sealed this

Seventh Day of June, 2005

JON W. DUDAS
*Director of the United States Patent and Trademark Office*